W. DOUGHERTY.
Manufacture of Steel.
No. 139,778. Patented June 10, 1873.
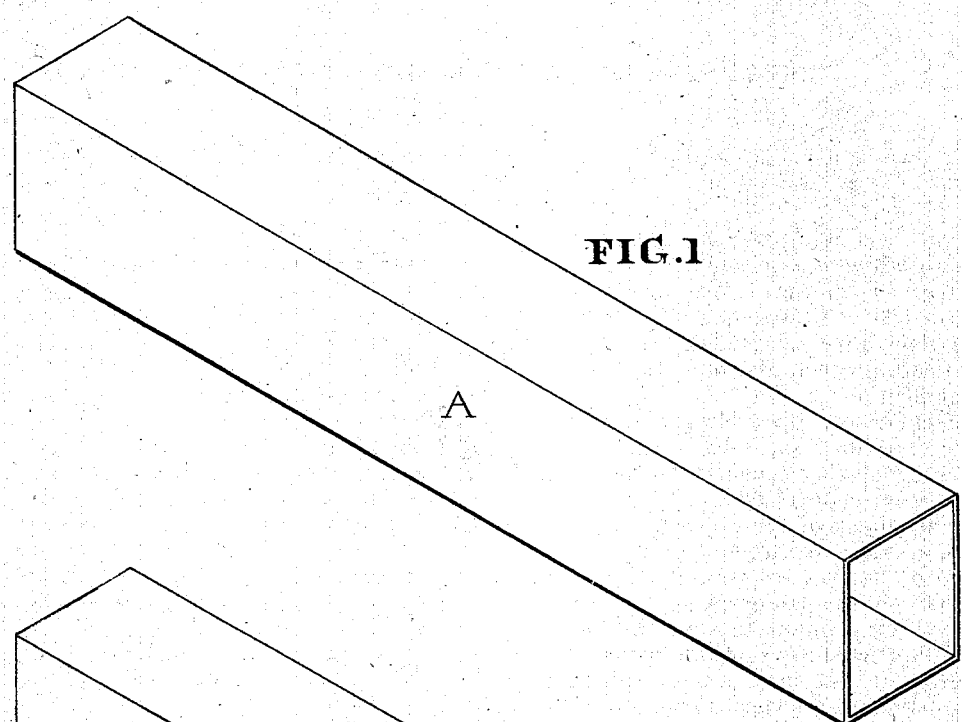
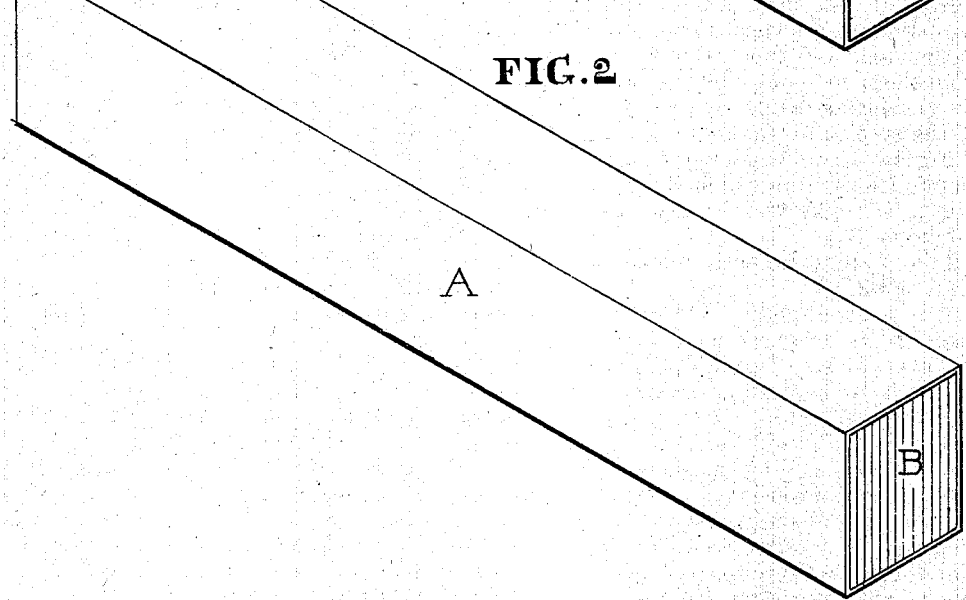

UNITED STATES PATENT OFFICE.

WILLIAM DOUGHERTY, OF PHILADELPHIA, PENNSYLVANIA.

IMPROVEMENT IN THE MANUFACTURE OF STEEL.

Specification forming part of Letters Patent No. 139,778, dated June 10, 1873; application filed March 18, 1873.

*To all whom it may concern:*

Be it known that I, WILLIAM DOUGHERTY, of the city of Philadelphia and State of Pennsylvania, have invented certain Improvements in Casting Steel, of which the following is a specification:

Steel cast in the ordinary process is rarely free of seams, soft places, honey-comb, &c., thereby causing considerable loss to the manufacturer or purchaser.

The object of my invention is the production of steel free from these defects. The invention relates to casting of the ingots in sheet-metal molds or cases, of such thickness as will be brought to a welding heat without chilling the surface of the ingots, so that the steel and case may cool and shrink simultaneously, and the case become thereby welded to the steel, and thus exclude the atmosphere from the latter and thereby prevent such imperfections as result from the shrinking away of the steel from the mold.

Figure 1 is an isometrical view of the sheet-metal case A, into which the metal is poured. Fig. 2 is a like view of the case containing the ingot B.

Like letters in both figures indicate the same parts.

A is a sheet-metal case or mold of square form in its cross-section. I make the case, however, of any form and size the ingot B is required to be, taking care to not have the sheet out of which it is formed of greater thickness than will be brought to a welding heat without cooling the surface of the melted steel when poured into it, so that the case and ingot may cool simultaneously and a complete welding be produced. The sheets out of which the cases are formed should not be too thick, otherwise a welding will not take place, and the thickness should vary according to the size of the case; consequently, for casting small bars of steel, say two or three inches in diameter, the thickness should not be more than the sixteen wire-gage. The steel thus incased when put into the furnace for heating, having its surfaces completely protected from the atmosphere, retains the carbon in its imperfect places as well as in the solid parts of the metal, and, consequently, when subjected to the action of the rollers or hammers, a complete welding of the metal is produced, and a homogeneous mass of the metal is the result. A portion of the metal case or mold is burnt or wasted away during the process of heating the steel. The remainder, being thin, is taken off, or nearly so, in the working of the metal, so that no inconvenience results from the steel being incased.

In the usual method of casting ingots in thick cast-iron molds the mold chills the surface of the ingot, causing a deep hole in the upper end, which is technically called piping. This occasions the necessity of breaking off the end of the ingot, and thus a loss of from ten to twenty-five per centum of the steel. In casting in my process, the mold or case, being thin, does not cool the melted steel, and being brought to a welding heat by the latter, as above specified, the steel cools slowly and uniformly with it, closing in to the center of the ingot, and thus avoiding the piping incidental to the usual mode of casting in thick molds.

I claim as my invention—

The method of casting steel in wrought-iron or other metallic cases when the latter is of such thickness as to admit of the heat of the melted steel completely welding the case to it, substantially as and for the purpose above set forth.

In testimony that the above is my invention I have hereunto set my hand and affixed my seal this 25th day of January, 1871.

WILLIAM DOUGHERTY. [L. S.]

Witnesses:
STEPHEN USTICK,
THOMAS J. BEWLEY.